United States Patent [19]

Phillips

[11] Patent Number: 4,763,873

[45] Date of Patent: Aug. 16, 1988

[54] FLUID CONTROL VALVES

[75] Inventor: Ronald Phillips, Northolt, England

[73] Assignee: Lucas Industries public limited company, Birmingham, England

[21] Appl. No.: 31,219

[22] Filed: Mar. 24, 1987

Related U.S. Application Data

[63] Continuation of Ser. No. 712,643, Mar. 18, 1985, abandoned.

[30] Foreign Application Priority Data

Apr. 6, 1984 [GB] United Kingdom ................. 8408930

[51] Int. Cl.[4] ...................... F16K 31/363; F16K 31/40

[52] U.S. Cl. ................................... 251/30.05; 251/44; 123/506

[58] Field of Search ................ 251/30.05, 44; 123/506

[56] References Cited

U.S. PATENT DOCUMENTS 620,829 3/1899 Batchelor ......................... 251/30.05
1,114,431 10/1914 Bopp ............................... 251/30.05
2,634,754 4/1953 Rahn ................................ 251/44 X
3,106,936 10/1963 Trautman ......................... 251/44 X
3,980,002 9/1976 Jarman et al. ............... 251/30.05 X

*Primary Examiner*—Arnold Rosenthal

[57] ABSTRACT

A fluid control valve comprises a valve member slidable in a bore about one end of which is defined a seating. The valve member has a valve head located in a first chamber which in use is connected to a source of fluid under pressure. Below the valve head the valve member and bore define a second chamber into which fluid can flow from the first chamber when the control valve is open. The first chamber has an end wall which is engaged by the valve head in the open position and the end wall and valve head define a recess. In the open position of the valve the pressure in the recess is low but when fluid is supplied to the recess the pressure therein increases and the valve member moves to the closed position to prevent flow of liquid between the first and second chambers.

3 Claims, 2 Drawing Sheets

FLUID CONTROL VALVES

This application is a continuation of application Ser. No. 712,643, filed Mar. 18, 1985 now abandoned.

This invention relates to a fluid control valve including a valve member slidable in a bore, a head forming part of the valve member, said head being located at one end of the valve member in a first chamber defined at one end of the bore, said first chamber in use receiving fluid under pressure, and a seating defined at said one end of the bore for engagement by the head to prevent flow of fluid from said first chamber to a second chamber defined by the bore and the valve member downstream of said seating.

The valve member may be moved by an actuating means such for example as an electromagnetic device, to the closed position. In this case the valve member must be urged to the open position by resilient means. The force exerted by the resilient means must be overcome by the electromagnetic device when closing the valve although as the valve member moves towards the closed position an increasing force will be exerted on the head of the valve member tending to close the valve, by the fluid pressure. Alternatively the valve may be held in the open position by the electromagnetic device which is de-energised to allow closure of the valve this being achieved by the fluid pressure acting on the head of the valve although this movement may be assisted by resilient means. The stroke of the electromagnetic device must be at least that of the valve member which in the open position must not impede to any substantial extent the flow of fluid from the first to the second chambers. The electromagnetic device can therefore be bulky and require considerable electrical power for its operation.

It is possible to move the valve member using other forms of actuating means for example, a fluid pressure operable piston member or even a mechanical mechanism.

The object of the present invention is provide a fluid control valve in a simple and convenient form.

According to the invention in a fluid control valve of the kind specified said first chamber is bounded by a wall which extends parallel to and is engageable by the end face of said head in the open position of the valve member, said wall and said end face when in engagement with each other defining a space therebetween which is closed off from said first chamber, and means for controlling the pressure in said space whereby in the open position of the valve member the pressure in said space is lower than the pressure in the first chamber and when said means is operated the pressure in said space is increased whereby the valve head is moved into contact with the seating by the pressure of fluid in said first chamber and the flow of fluid into said second chamber is prevented.

Figure 1:
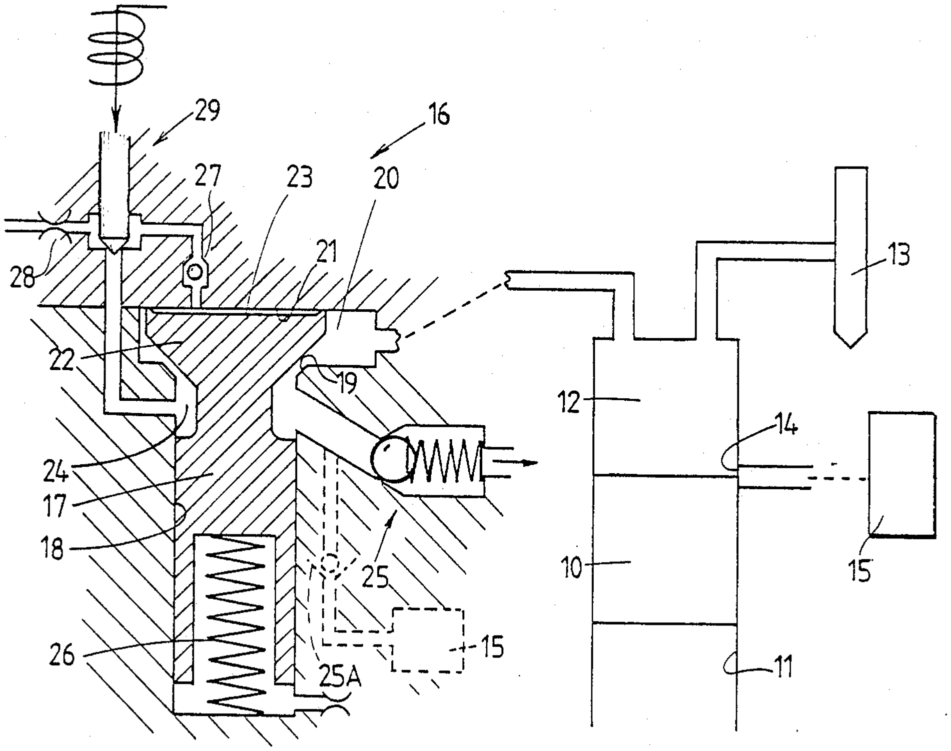
Figure 2:
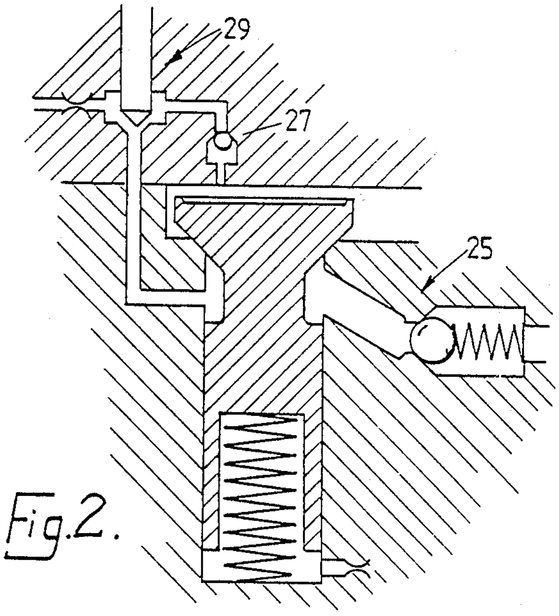
Figure 3:
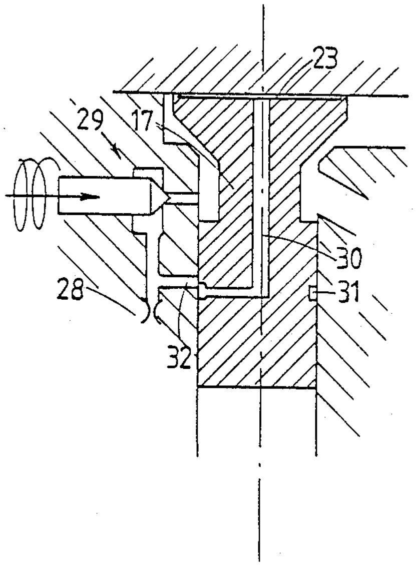
Figure 4:
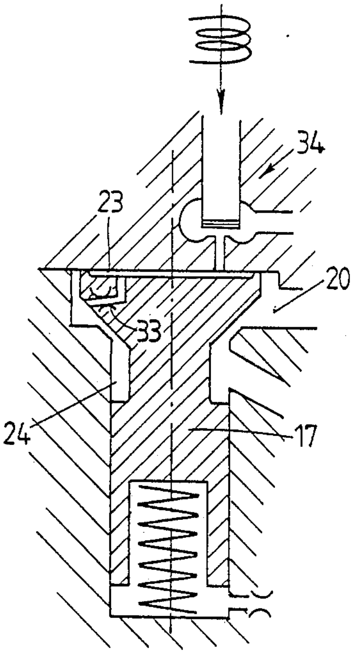
Figure 5:
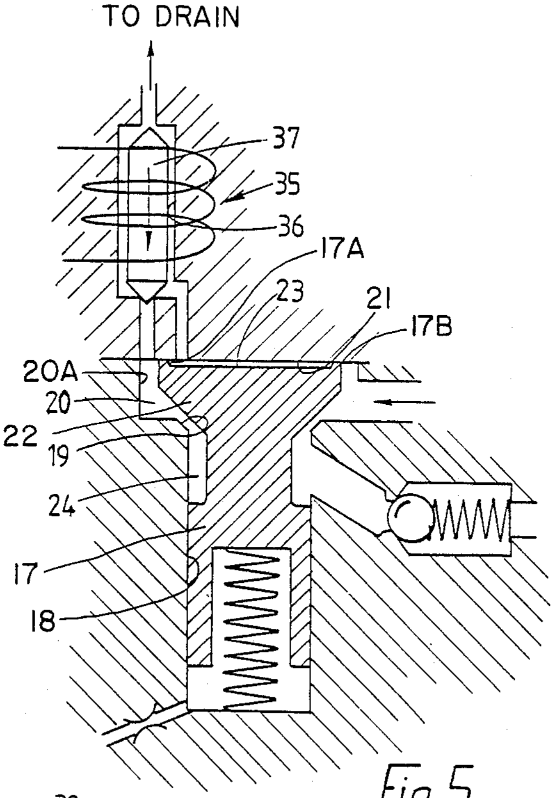
Figure 6:
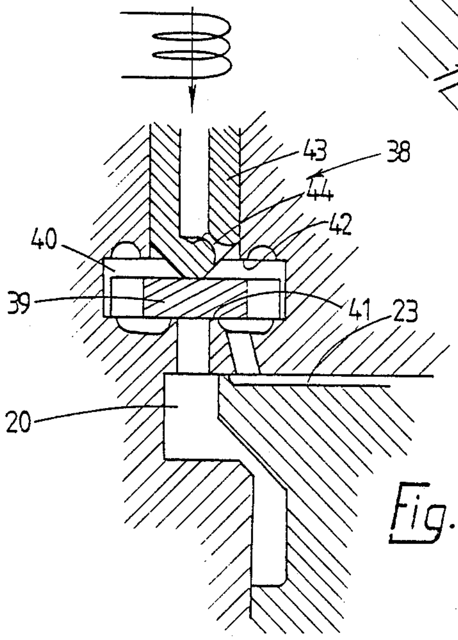

Examples of fluid control valves in accordance with the invention will now be described with reference to the accompanying drawings in which:

FIG. 1 shows one example of the valve in association with a fuel injection pump for supplying fuel to a compression ignition engine, FIG. 2 shows the valve of FIG. 1 in its alternative position, FIGS. 3 and 4 show alternative forms of the valve, FIG. 5 is a further alternative form of the valve, and FIG. 6 shows a modification of the valve seen in FIG. 5.

Referring to FIG. 1 of the drawings the fuel pumping apparatus comprises a piston 10 which is reciprocable within a bore 11. The piston and bore define a pumping chamber 12 which communicates with a fuel injection nozzle 13 disposed in use to direct fuel into a combustion chamber of an associated engine. The plunger 10 has a fixed stroke and is moved inwardly to reduce the volume of fuel in the pumping chamber 12, by the action of a cam driven by the associated engine. It can be moved outwardly by the action of a coiled compression spring or a further cam arrangement may be provided to effect this movement. As the plunger nears the outer position of its stroke it uncovers a port 14 formed in the wall of the bore and communicating with a source 15 of fuel under pressure. As soon as the port 14 is uncovered fuel from the source 15 flows into the pumping chamber to completely fill the pumping chamber with fuel.

In order to control the amount of fuel supplied to the fuel injection nozzle 13 a fuel control valve, generally indicated at 16, is provided this valve allowing until it is closed, the fuel displaced from the pumping chamber 12 to flow to a drain rather than to the injection nozzle. At some point during the inward movement of the plunger and after the port 14 has been closed, the valve 16 is closed whereupon fuel will be displaced to the injection nozzle for as long as the plunger moves inwardly.

The valve 16 comprises a valve member 17 slidable within a bore 18 at one end of which is formed a seating 19. Beyond the seating 19 is defined a first chamber 20 which is connected by a conduit to the pumping chamber 12. The valve member is provided with a head 22 shaped to co-operate with the seating 19 and also having an end face which can contact an end wall 21, the wall 21 extending parallel to the end face of the valve member. As will be noted, the chamber 20 has a side wall 20A and the valve head 22 is spaced from the side wall 20A. The end wall 21 and the end face of the valve member define a space 23, the area of the space 23 being chosen so that in use as will be explained, the head will be maintained in contact with the end wall when the pressure in the space is at a drain pressure.

The valve member beneath the head is of reduced diameter to define with the wall of the bore 18 a second chamber 24 which is connected by way of a spring loaded non-return valve 25, to a drain. The valve member is lightly biased by a coiled compression spring 26 so that the end face of the valve member abuts against the end wall 21. This is the fully open position of the valve member. Alternatively the bore may have an enlarged portion beneath the seating, the enlarged portion defining with the valve member the aforesaid second chamber.

In the fully open position of the valve member the aforesaid space 23 communicates by way of an isolating valve 27 with a drain by way of a restrictor 28 so that the space is at a lower pressure than exists in the chamber 20. In order to raise the pressure in the space 23 to that which prevails in the chamber 20, an electromagnetically operated valve 29 is provided and which when opened, places a point intermediate the restrictor 28 and the isolating valve 27 in communication with the second chamber 24.

Considering now the operation of the valve and assuming that the pumping plunger of the injection pump is moving upwardly and the port 14 has been closed. In this situation and with the components as shown in FIG. 1, fuel displaced from the pumping chamber flows into the first chamber 20 and then from the first chamber it flows into the second chamber and to the drain by way of the non-return valve 25. The non-return valve 25 acts to ensure that the fuel in the second chamber is pressurised. If now the valve 29 is opened, fuel from the second chamber flows through the valve to a point intermediate the restrictor 28 and the isolating valve 27 thereby raising the pressure in the space 23. In this situation the forces acting on the valve member are such that it starts to move to the closed position. It will be understood that as soon as the end face of the head of the valve member leaves the end wall 21, the fuel pressure in the first chamber acts on the full end area of the head of the valve member and the valve member is rapidly moved to the closed position in which the head 22 engages the seating 19. The pressure in the chamber 20 therefore rises very quickly to the pressure which is required to open the valve in the injection nozzle 13 and as soon as this occurs, fuel is delivered to the associated engine. The isolating valve 27 due to the increased pressure in the chamber 20, moves into a blocking condition to prevent escape of fuel from the pumping chamber through the restrictor 28.

FIG. 2 shows the situation when the valve member has moved into contact with the seating and it will be seen that the non-return valve 25 has closed and the isolating valve 27 is in a blocking condition. The valve member remains in this position until it is returned by the action of the spring 26 when the pressure of fuel in the pumping chamber falls. This takes place as soon as the pumping plunger reaches the end of its stroke and starts its return stroke. The pressure in the chamber 20 falls and the isolating valve 27 moves out of its blocking condition. Some fuel will flow into the pumping chamber by way of the isolating valve and the restrictor but the main volume of fuel flows into the pumping chamber through the port 14 when the latter is uncovered by the plunger. During the return motion of the pumping plunger the valve 29 is closed ready for the next cycle of operation.

In a modification not shown, the valve 25 is omitted and the second chamber 24 connected for example to the source 15 of fuel. In this case therefore the spilled fuel will be returned to the source and furthermore, as soon as the valve member 17 moves to the open position, fuel can flow into the pumping chamber by way of the second and first chambers. However, the spillage of fuel to the low pressure source of fuel may cause undesirable fluctuation of the pressure of fuel supplied by the source and therefore a non-return valve 25A can be incorporated into the connection of the second chamber to the source 15 of fuel in which case the spilled fuel is not returned to the source. In this case however it is necessary to provide the valve 25 to permit the fuel to be spilled from the pumping chamber during the initial inward movement of the pumping plunger.

The valve 29 can be very small since the flow of fuel through the valve will be extremely small. It can be spring biased to the closed position and therefore the associated solenoid is energised when it is required to open the valve or the valve may be arranged so that the solenoid has to be energised to close the valve.

The isolator valve 27 may be omitted by using the movement of the valve member 17 to prevent fuel flow through the restrictor 28. This arrangement is shown in FIG. 3 where the space 23 is connected to the valve 29 by way of a passage 30 formed in the valve member. The passage 30 communicates with a peripheral groove 31 on the valve member which groove in the fully open position of the valve member 17, registers with a port 32 connected to the restrictor 28. In this case therefore as soon as the valve 29 is opened and fuel under pressure flows into the space 23 from the second chamber, the valve member starts to move and immediately cuts off the communication between the groove 31 and port 32. It therefore acts in the manner of the isolating valve.

A further modification is shown in FIG. 4 and in this case the first chamber 20 communicates with the space 23 by way of a restrictor 33 formed in the head. The valve which controls the pressure in the space 23 is indicated at 34 and in the open position of the valve member 17 the valve 34 is open to a drain so that the pressure in the space 23 is substantially the drain pressure. The predominating force acting on the valve member 17 is therefore such as to maintain the end face of the valve member in contact with the wall of the chamber. When the valve 34 is closed the pressure in the first chamber 20 is applied by way of the restrictor 33 to the space 23 and in this situation the valve member is unbalanced and moves rapidly to its closed position. The valve 34 is of the type which must be energised to close and it does of course have to be able to withstand the pressure of fuel within the pumping chamber when the valve 17 is closed.

The area of the space 23 may be equal to or smaller than the area enclosed by the valve seat 19. The area must be determined bearing in mind the available fuel pressure which can be supplied to the space, the effective area of the valve member and the force exerted by the return spring 26.

In the form of valve seen in FIG. 5 in which like parts have the same reference numerals as the form of valve seen in FIG. 1, the first chamber 20 can be connected to the space 23 by means of a valve 35. The head 22 of valve member 17 has a blind-ended bore 17A defined axially thereof and an end face 17B located adjacent to said blind-ended bore. The end face 17B is engageable with the end wall 21 in the open position of the valve member 17 so that the blind-ended bore 17A and end wall 21 define space 23. The valve 35 comprises an elongated chamber 36 at the opposite ends of which are defined seatings. The seating at one end surrounds a port connected to the chamber 20 and the seating at the other end defines a port connected to a drain. The end of the chamber adjacent the port connected to the first chamber communicates with the space 23 and slidable within the chamber 36 is a valve element 37 which conveniently has conical end portions for engagement with the aforesaid seatings respectively. The valve element is conveniently formed from magnetizable material and forms the armature of a solenoid. A limited clearance exists between the walls of the valve element and chamber which when the valve element is in the position shown connects the space 23 with the drain. When the solenoid is de-energised the valve element moves to the other end of the chamber and in so doing the space 23 is placed in communication with the first chamber and the escape of fuel at high pressure to the drain is prevented, the valve 17 is then closed as described.

In the modification of FIG. 6 the valve 38 functions in the same manner as the valve 35. The construction however employs a plate valve member 39 located in a chamber 40. Opposite walls of the chamber define annular seatings 41, 42 surrounding ports opening into the chamber 40. Slidable within the port defined within the setting 42 is an actuating member 43 which may form the armature of a solenoid but is at least connected to the armature. The actuating member is provided with an axial passage which opens within the seating 42 by way of a restrictor 44. The axial passage communicates with a drain and the port defined within the seating 41 communicates with the first chamber and the chamber 40 communicates with the space 23. The plate valve member 39 is provided with peripheral cut outs so that in the position shown the space 23 communicates with the drain by way of the restrictor 44. When the solenoid is de-energised the plate valve member is moved by the fuel pressure into contact with the seat 42 thereby placing the space 23 in communication with the first chamber 20 and preventing fuel flow to drain. The passage in the actuating member and the restrictor 44 can be replaced by a clearance between the actuating member and the wall of the bore in which it is located.

I claim:

1. A fluid control valve comprising a body, a bore formed in the body and a first chamber formed in the body adjacent to one end of said bore, said first chamber having a side wall and an end wall which faces said one end of said bore, said first chamber in use receiving fluid under pressure, a seating located on said body about said one end of the bore, a valve member slidable in the bore and adapted to assume a closed position and an open position, a head formed on said valve member, the head being located in said first chamber and spaced from the side wall thereof, said head being shaped for co-operation with said seating and having a blind-ended bore defined axially thereof and an end face located adjacent to said blind-ended bore, said end face being engageable with said end wall in the open position of the valve member so that said blind-ended bore and said end wall define a space that is fluidly isolated from said first chamber, a second chamber defined by the bore and the valve member downstream of said seating, the head engaging with said seating to prevent flow of fluid from said first chamber to the second chamber, and means for controlling the pressure in said space with the pressure in said space being lower than the pressure in the first chamber when the valve member is in the open position, said means for controlling the pressure in said space including means fluidly connecting said first chamber to said space and conducting fluid from said first chamber to said space to increase pressure in said space sufficiently to move said end face away from contact with said first chamber end wall to fluidly connect said space with said first chamber to increase the pressure applied against said valve member in the area of said valve member adjacent to said space sufficiently to move the valve head into contact with the seating and to prevent the flow of fluid into the second chamber, said means for controlling pressure in said space further including a valve means which in a first position establishes fluid communication between said first chamber and said space and in a second position prevents such fluid communication, and a drain means fluidly connected to said valve means and which is in fluid communication with said space when said valve member is in the closed position, said valve means preventing fluid communication between said space and said drain means when said valve means is in said first position, and means for operating said valve means between said first and second positions.

2. A control valve according to claim 1 in which the means for controlling the pressure in said space includes a solenoid operable valve which can be opened to admit fluid under pressure from one of said chamber into said space.

3. A control valve according to claim 1 in which said means for operating said valve means includes a solenoid and said valve means is formed from magnetizable material to form an armature of said solenoid.

* * * * *